July 23, 1963 B. D. LOUGHLIN 3,098,895

ELECTRONIC PREVIEWER FOR TELEVISED COLOR PICTURES

Filed Dec. 2, 1958 4 Sheets-Sheet 1

July 23, 1963 B. D. LOUGHLIN 3,098,895

ELECTRONIC PREVIEWER FOR TELEVISED COLOR PICTURES

Filed Dec. 2, 1958 4 Sheets-Sheet 2

July 23, 1963 B. D. LOUGHLIN 3,098,895

ELECTRONIC PREVIEWER FOR TELEVISED COLOR PICTURES

Filed Dec. 2, 1958 4 Sheets-Sheet 4

United States Patent Office | 3,098,895 Patented July 23, 1963

3,098,895

ELECTRONIC PREVIEWER FOR TELEVISED COLOR PICTURES

Bernard D. Loughlin, Huntington, N.Y., assignor to Hazeltine Research, Inc., Chicago, Ill., a corporation of Illinois Filed Dec. 2, 1958, Ser. No. 777,726
10 Claims. (Cl. 178—5.2)

Figure 1:
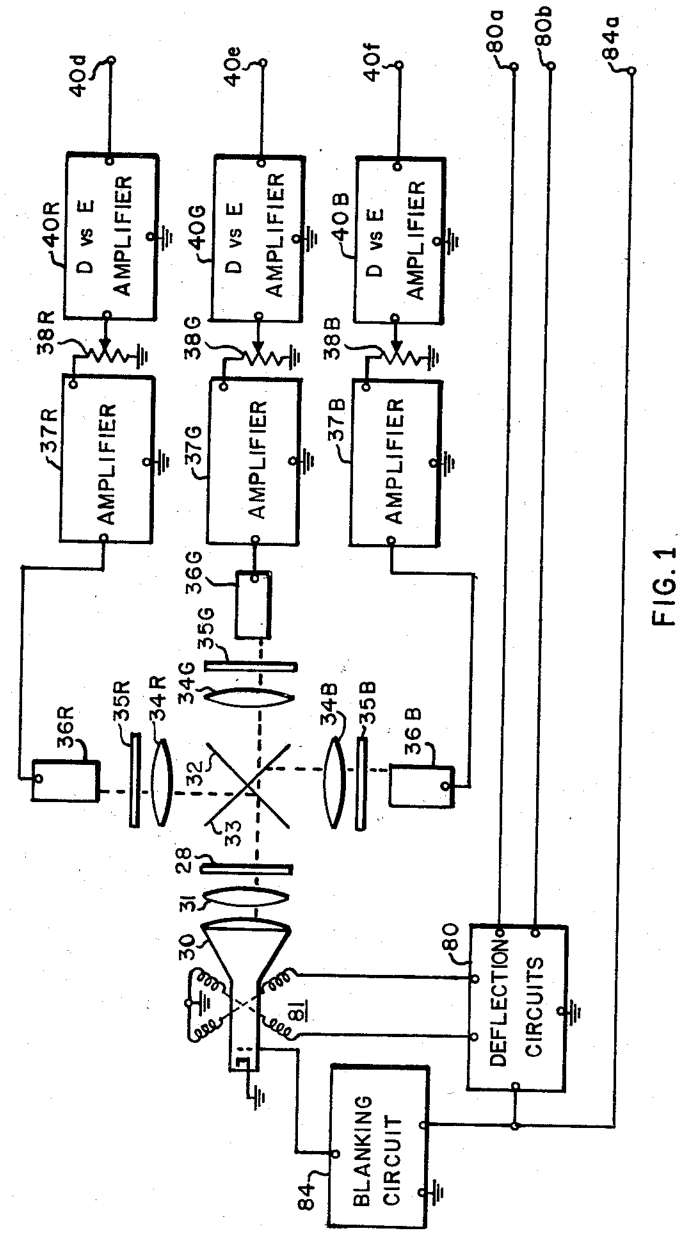

This invention relates to means for simulating and controlling the color reproduction characteristics of systems for producing color-television images from color pictures, and particularly to electronic previewing means by which the color reproduction characteristics of a combined photographic and color-television system may be simulated and controlled so that color photographs derived by the photographic system will produce received color images of optimum quality in the color-television system.

The copending joint application of W. F. Bailey, C. E. Page, and applicant, entitled "Electronic Previewer for Negative Color Films," Serial No. 662,199, filed May 28, 1957, now Patent No. 2,976,348, discloses apparatus for producing an electronically simulated image of color pictures which may be derived from original color pictures by a series of photochemical processing operations. For a complete description of the construction and mode of operation of such previewing apparatus, reference should be made to that application. Briefly, however, a particular embodiment thereof may comprise means for scanning an original color picture, such as a photograph on negative color film, and deriving therefrom electrical signals corresponding to respective primary color components thereof. The taking responses of the scanning means for those color components are adjusted in accordance with the respective taking sensitivities of a plurality of color-sensitive materials which are employed in a photochemical process for producing a derived color picture from the original picture. These materials may be the respective emulsions of a positive color film, such emulsions being respectively responsive to a predetermined set of primary color components of a printing light which is transmitted through a negative color film photograph from which a positive color film photograph or "print" is to be derived. The electrical signals will therefore be proportional to the exposures to which the color-sensitive materials are respectively subjected in the actual photochemical process. In the interest of simplifying the ensuing description, it will be assumed that the original picture is one on negative color film and that the picture to be derived therefrom is a color print.

The exposure-representative signals are translated by means for adjusting their amplitudes in proportion to the relative intensities of the above-mentioned color components of the printing light actually employed in the photochemical process, and are then applied to nonlinear circuits which respectively modify them in accordance with the relationship between the exposure of each of the positive film emulsions and the densities of the corresponding color dyes produced therefrom as a result of subsequent chemical development. Each dye has a spectral absorption characteristic generally corresponding to the color component associated with the emulsion which produced it. Accordingly, when placed in overlaid relationship, they cooperate to subtractively modify those color components of substantially white illumination incident thereon to produce the color image representing the derived print. However, since the dye absorption characteristics overlap, to some extent, the colors of the print tend to be less saturated than those of the original negative. Simulation of this dye behavior is achieved in the previewer by first cross-coupling or "matrixing" the density-representative signals so as to simulate the effects of overlapping of their spectral absorption characteristics, and then applying the matrixed signals to means including an image-reproducing device for simulating the exponential relationship between density and light transmission of each dye when the print is viewed as described.

The previewer of applicant's copending joint application thus produces an electronic color image of the color print which will be produced by the photochemical process when the respective color components of the printing light employed therein are adjusted in correspondence with the settings of the previewer controls. Conversely, when those controls are adjusted to obtain a desired appearance of the electronic image, a corresponding adjustment of the printing light composition will yield a color print also having the desired appearance.

While such an electronic previewer adequately simulates the photochemical processing operations, to enable control thereof to produce derived color pictures of optimum quality for visual observation, it may not give direct information for producing derived color pictures of optimum quality for use as program material in a color-television system. This is because the colors of the received image in such a system may not be identical to those of the color picture. One source of such departure is the limited contrast range of the receiver image-reproducing device, compared to the usual type of originally photographed scene, and the corrections applied to the color-television system to compensate for this limitation. The normal color film system, being color subtractive as indicated above, can reproduce bright saturated colors. However, due to its reasonably wide contrast range, it can reproduce dim saturated colors. Conversely, since the color-television system is color additive it can reproduce bright saturated colors, but the limited reproducible contrast range limits the production of dim saturated colors. Accordingly, it has become rather standard practice to employ excess gamma correction at the television transmitted in order to raise the relative brightness of dim or lowlight regions of the received image. Electronic masking circuits are then employed to compensate for the saturation reduction produced by such over-gamma correction and also to attempt to compensate to some extent for other colorimetric errors. Such other errors may result from the unwanted spectral absorptions of the film dyes, and from deviation of the film spectral taking responses from the proper set for matching the color components produced by the television receiver image-reproducing means. For a further discussion of excess gamma-correction and associated color-correction techniques, reference should be made to the article "Brightness Modification Proposals for Televising Color Film," by Brewer et al., appearing at pages 174–191 of the Proceedings of the I.R.E. for January 1954, and also to the article, "The Use of Electronic Masking in Color Television," by Burr, at pages 192–200 of the same publication.

While the television system corrections just cited tend to correct for its color-reproducing deficiencies, they still do not result in the colors of the received television image being identical to the visual color characteristics of the color photograph being transmitted. Instead, those corrections merely restore the colors of the televised image to a "pleasing," but not necessarily identical, appearance. Consequently, in order to use an electronic previewer to adequately control the composite color-reproduction characteristics of the photographic and television systems, it is necessary to simulate the over-all combination and interaction of both systems.

A still further problem in controlling the production of received color-television images of color pictures is that while presently available electronic masking and excess gamma-correction equipment can conceivably be adjusted on each of a succession of scenes to provide optimum operation of the television system, the various adjustments produce closely interrelated visual corrections in the image. Accordingly, a long trial-and-error procedure involving a great expenditure of time and effort would be required. For this reason, scene-to-scene adjustment with such equipment is impractical and a single compromise adjustment is employed for all or major groups of a given series of scenes. Manifestly, less than optimum results will thereby have to be accepted.

Accordingly, an object of the instant invention is to provide electronic previewing means for simulating and indicating the proper quantitative control of the color-reproduction characteristics of a combined photographic and color-television system so that color pictures derived by the photographic system will produce received color images of optimum quality in the color-television system.

A further object is to provide means for simulating and controlling photochemical processes for producing derived color pictures for use in a color-television system so that such derived pictures will result in received color images of optimum quality for specified color-reproduction characteristics of the color-television system.

A further object is to provide means for simulating and controlling the color-reproduction characteristics of a color-television system so that color pictures to be transmitted thereby will produce received images of optimum colorimetric quality.

A further object is to provide means by which the signal-processing characteristics of the transmitter in a color-television system may be conveniently adjusted to effect substantially independent control of selected colorimetric characteristics of the received images which will be produced by such system from a color picture to be transmitted thereby.

In accordance with the foregoing objects, the invention comprises an electronic previewer for simulating the color-processing characteristic of a system wherein a derived color picture is photochemically prepared from an original color picture and the derived picture is utilized in a color-television system to obtain a received color-television image thereof. The photochemical process will generally be one wherein a plurality of color dyes are produced in the derived picture having densities determined by the relative proportions of corresponding color components of a printing light transmitted through the original picture, and wherein the color-television system includes a transmitter which scans the derived picture to produce original signals representative of predetermined color components thereof and processes those signals to convert them to resultant signals for actuating a color-television receiver to display an image of that picture. The novel previewer comprises the combination of means for scanning the original picture and means adapted to simulate said photochemical process and the spectral taking characteristics of the television transmitter so as to obtain color-representative signals respectively corresponding to the original signals produced by said transmitter from said derived picture, such simulating means being adapted to adjust the relative proportions of such color-representative signals. The previewer further comprises means for nonlinearly translating the color-representative signals and signal-processing circuit means for modifying each of the translated signals in accordance with at least least part of the signal processing by which the color-television transmitter converts the corresponding ones of the original signals to the resultant signals for actuating a color-receiver. Finally, the previewer comprises color-television image-reproducing means responsive to the modified signals from the signal-processing circuit means to produce a color image corresponding thereto. The color image thus produced by the previewer will have substantially the same appearance as that which will be produced by the color-television receiver when the relative proportions of the color components of the printing light employed in the photochemical process are adjusted in accordance with the adjustment of the simulating means of the previewer.

An aspect of the invention involves an adjustable electronic masking circuit for modifying the color characteristics of the image which the display of a color-television receiver produces in response to signals which are obtained by a color-television transmitter as a result of scanning a color picture, such signals being representative of a set of predetermined color components of such color picture. Such a masking circuit may comprise a first matrix circuit having a plurality of input and output terminals together with means for applying the color-representative signals to respective ones of the input terminals. This matrix is adapted to cross-couple predetermined proportions of the color-representative signals with each other to produce a plurality of modified color-representative signals at its respective output terminals. The masking circuit may further include a second matrix circuit having a plurality of input and output terminals together with signal-translating means for establishing controllable signal transmission paths between the output terminals of the first matrix and the input terminals of the second matrix. Such signal-translating means translates controlled proportions of each of the modified color-representative signals to selected ones of the input terminals of the second matrix. Also, the second matrix is adapted to cross-couple predetermined proportions of the modified signals at its input terminals with each other so as to produce at its output terminals a set of further modified output signals suitable for actuating the display of the color-television receiver to produce a color image of the color picture. Selected color characteristics of the image so produced will then be individually determined by the signals at individual ones of the input terminals of such second matrix.

For a better understanding of the present invention, together with other and further objects thereof, reference is had to the following description, taken in connection with the accompanying drawings, and its scope will be pointed out in the appended claims.

Figure 1A:
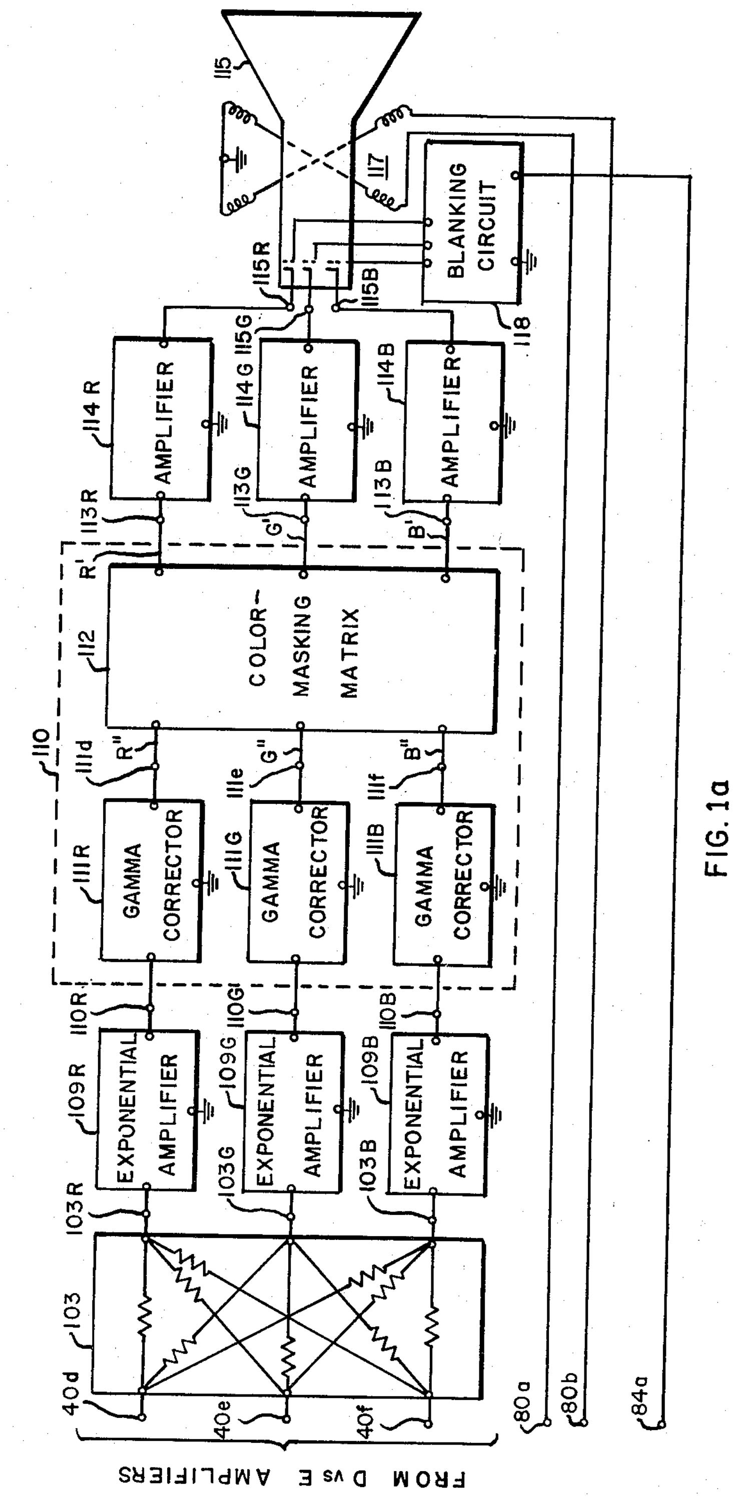
Figure 3:
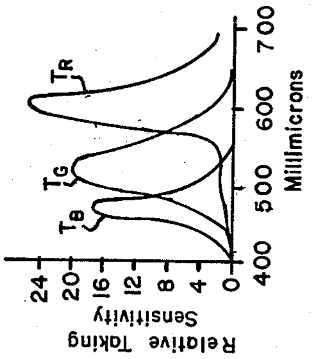
Figure 2:
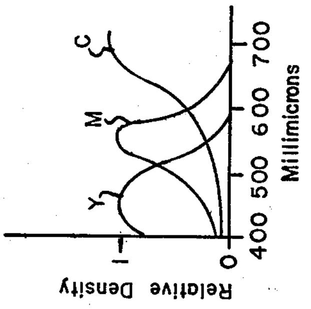

Referring to the drawings:

FIG. 1 is a diagram of the input portion of the electronic previewer of applicant's copending joint application, Serial No. 662,199, and which may be used as the input portion of an electronic previewer in accordance with the present invention;

FIG. 1*a* is a circuit diagram of an illustrative embodiment of a portion of an electronic previewer in accordance with the instant invention which may be used with the portion thereof in FIG. 1 to provide a complete embodiment;

FIGS. 2 and 3 are curves respectively illustrative of the spectral characteristics of positive color film dyes and of a typical color-television film scanner.

Figure 4:
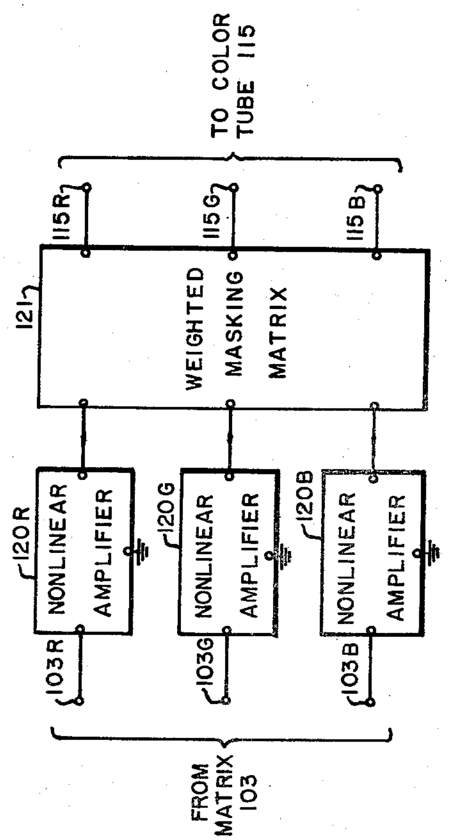
Figure 5:
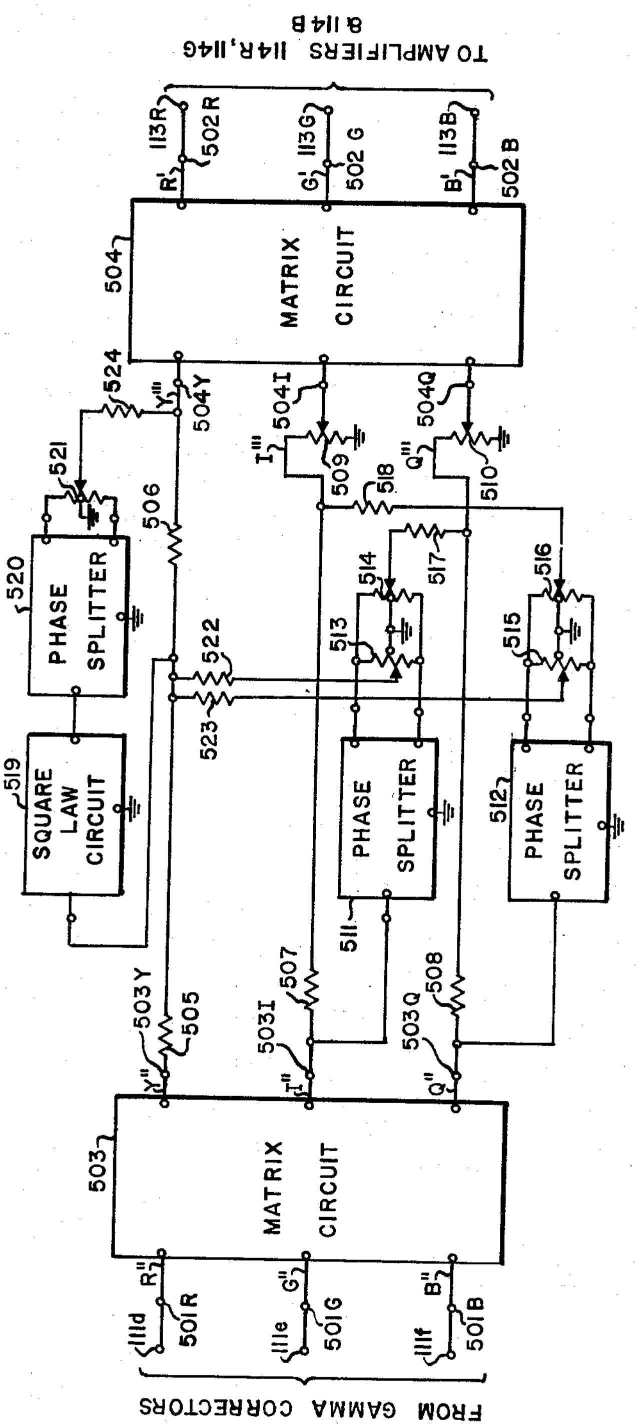

FIG. 4 is a circuit diagram of a simplified modification of a portion of the circuit of FIG. 1*a* which may be employed under conditions described hereinafter, and FIG. 5 is a circuit diagram of means in accordance with the invention by which the color signal-processing characteristics of the circuit of FIG. 1*a* and of a corresponding portion of the transmitter in a color-television system may be conveniently adjusted to substantially independently control selected colorimetric characteristics of the simulated image produced by the invention and the same characteristics of the received image produced by such system.

Referring to FIG. 1, all of the equipment and circuitry therein is identical with the correspondingly referenced equipment and circuitry shown in FIG. 5 of applicant's copending joint application, Serial No. 662,199, identified above. As illustrated, an original color picture 28, such as the image on a negative color film transparency, is scanned by a flying spot of light produced by cathode-ray tube 30 and focused thereon by condensing lens 31. The resultant colored light from the picture is resolved by dichroic mirrors 32 and 33 into substantially separate red, green, and blue components respectively directed to photocells 36R, 36G, and 36B. A condensing lens and color-compensating filter in the light path to each photocell permits adjustment of the spectral responses thereof to the three beams respectively in accordance with the taking sensitivities of the three color-sensitive materials employed in a photochemical process for obtaining a derived color picture from picture 28. In the interest of simplifying the ensuing description, and since the principles set forth are applicable to many types of picture reproduction processes, it will be supposed that these materials are the three emulsions of a typical positive color film which is subjected to a photographic developing and printing process involving exposure to the light from negative film 28 when the latter is illuminated by the printing light employed in conventional color printer apparatus. The taking sensitivities referred to are then those of the red-, green-, and blue-sensitive positive film emulsions to the printing light. The signals produced by photocells 36R, 36G, and 36B are thereby individually proportional to the exposures to which the red, green, and blue color components of the printing light emergent from negative film 28 subject the corresponding positive film emulsions in the photographic developing and printing process.

The exposure-representative signals are respectively translated by linear amplifiers 37R, 37G, and 37B to potentiometers 38R, 38G, and 38B, the tap settings of which constitute one set of controls of an electronic previewer in accordance with the present invention. The gains of amplifiers 37R, 37G, and 37B are adjusted so that the translated signals are in the same proportions as the exposures of the positive film emulsions when the controls of the previewer and of the color printer employed in the photographic process are at corresponding calibrated settings. Consequently, the setting of each potentiometer will directly correspond to the setting of the color printer control for the corresponding color component of the printing light. The adjusted exposure-representative signals at the taps of potentiometers 38R, 38G, and 38B are respectively applied to nonlinear amplifiers 40R, 40G, and 40B, the transfer characteristics of which simulate the dye density vs. exposure characteristic of the corresponding positive film emulsions. The signals at the amplifier output terminals **40*d*, 40*e*, and 40*f*** are thus respectively proportional to the densities of the dyes produced by the red-, green-, and blue-sensitive emulsions. Since the photographic system is subtractive, these dyes will have the complementary colors cyan, magenta, and yellow.

In the electronic previewer of applicant's copending joint application the density-representative signals at terminals **40*d*, 40*e*, and 40*f*** are applied to a cross-coupling or matrix circuit which adds predetermined portions of one or more signals to others of the signals in accordance with the overlapping of the spectral absorption characteristics of the positive film dyes when the resultant positive print is illuminated for viewing. That is, as shown by the curves in FIG. 2, each dye causes some absorption of other color components of the incident illumination besides providing principal absorption of the color component which produced it and which it is intended to control. The actual density of the positive print to a given color component of the incident illumination is therefore the sum of the absorptions of that component by all of the dyes, and so is larger than the correct value. The actual red density, for example, may therefore be expressed as $$D_r = a_{cr}D_c + a_{mr}D_m + a_{yr}D_y \qquad (1)$$

where $D_c$, $D_m$, and $D_y$ are the respective densities of the cyan (*c*), magenta (*m*) and yellow (*y*) as determined by the total areas under the corresponding curves of FIG. 2, and $a_{cr}$, $a_{mr}$, and $a_{yr}$ are constants determined by the proportions of those areas lying within the red spectral region. Similar equations may be written for total green and blue density. The proportioning of the paths in the dye cross-coupling matrix of applicant's copending application is substantially in accordance with the nine constants so determined.

In distinction therefrom, in the present invention the density-representative signals at terminals **40*d*, 40*e*, and 40*f* in FIG. 1 are applied to cross-coupling matrix 103** of FIG. 1*a*. This matrix not only takes account of the overlapping spectral absorption characteristics of the positive film dyes, but also simulates the effects of such overlapping in relation to the spectral responses or "taking characteristics" of the film scanner comprised in the color television transmitter by which the positive film image is to be televised. Typical transmitter film scanner equipment is described on pages 289–305 of "Principles of Color Television" by the Hazeltine Laboratories Staff, published in 1956 by John Wiley & Sons, Inc. A representative set of taking characteristics for the scanner are shown in FIG. 3, these being established in accordance with the requirements set by the tricolor reproducing characteristics of the type of three-gun cathode ray tube presently used as the image-reproducing device of conventional color-television receivers. Curves $T_R$, $T_G$, and $T_B$ in FIG. 3, respectively, are the red, green, and blue characteristics. To obtain the equivalent density of the cyan dye as "seen" by the $T_R$ taking characteristic, for example, the area under the $T_R$ curve may be divided into the area of the curve obtained by multiplying each $T_R$ ordinate by the value of $10^{-C_D}$ at the corresponding wave length, where $C_D$ is the ordinate of the cyan dye density curve C in FIG. 2. The negative logarithm of the resulting quotient is then the required density. By following the same procedure for each of the $T_G$ and $T_B$ response curves in relation to density curve C, and then repeating all three steps for each of the remaining M and Y density curves (ordinates $M_D$ and $Y_D$ respectively) of FIG. 2, a set of nine constants representing the proportionate contributions of all three dyes to the total density "seen" by each of the three film scanner channels is obtained. The nine cross-coupling paths of matrix 103 are proportioned in accordance with the relative values of those constants.

The signals at matrix output terminals 103R, 103G, and 103B will be respectively proportional to the total densities of the positive film print to red, green, and blue light as seen by the television transmitter scanner. Signals proportioned to the intensities of those color components of the light obtained from the print by such scanning are then derived by respectively applying the matrixed density-representative signals to amplifiers 109R, 109G, and 109B for modifying them in accordance with the negative exponential relation between density and light transmission. Each of these amplifiers may be of the type disclosed in FIG. 8 of applicant's copending joint application referred to above. Assuming that the transmitter scanner is a linear optical-to-electrical transducer, whereby each channel thereof produces an electrical output signal proportional to the intensity of incident light thereon within the spectral area of its taking response, the resultant output signals from amplifiers 109R, 109G, and 109B will then also be respectively proportional to the electrical outputs of the red, green, and blue channels of the actual television transmitter. This will be true for a flying-spot scanner such as that shown on page 295 of the above-cited textbook Principles of Color Television. A scanner of the type employing three memory-type television camera tubes such as vidicons may have nonlinear transducing characteristics. In that case, such nonlinearity may be taken into account in an ensuing portion of the circuit of FIG. 1*a* as indicated hereinafter.

The output signals from amplifiers 109R, 109G, and 109B are respectively applied to input terminals 110R, 110G, and 110B of a circuit 110 which simulates the electrical processing operations to which original output signals produced by the television transmitter scanner are subjected in order to convert them to corrected signals suitable for actuating the display of a color-televison receiver. The transmitter signal processing of most significance with respect to color transmission includes gamma correction and electronic masking. These operations may be separately simulated, as shown in FIG. 1*a*, or may in some cases, as described below, be combined with the preceding exponential amplifiers as shown in FIG. 4. Considering the arrangement in FIG. 1*a*, gamma simulation is effected by a set of conventional gamma-corrector circuits 111R, 111G, and 111B respectively connected to terminals 110R, 110G, and 110B. Those circuits respectively have exponential signal transfer characteristics substantially in accordance with the reciprocal of the exponential light output versus input signal conversion characteristics of the red, green, and blue color-reproducing elements of the tricolor display means of the television receiver. As a result, signals R'', G'' and B'' at gamma-corrector output terminals 111*d*, 111*e* and 111*f* will correspond to the gamma-corrected signals in the color-televison transmitter. Gamma-corrector circuitry is described in chapter 11 of the aforementioned textbook, additional explanation of various modes of excess gamma correction in the interest of improved color reproduction in darker regions of the received television image being given on pages 167–175, inclusive, of the textbook Color Television Engineering by Wentworth, published in 1955 by McGraw-Hill Book Company, Inc.

The electronic masking operation of the television transmitter is simulated by a matrix circuit 112 connected to gamma correctors 111R, 111G, and 111B. This circuit may be identical to conventional transmitter masking matrix circuits which cross-couple the gamma-corrected signals R'', G'', and B'' applied thereto so as to compensate for dye cross-couplings in the televised photograph and for any color desaturation resulting from excess gamma correction. In present-day color-television transmitters the cross-coupling characteristics of the masking matrix are maintained at specified values during transmission of all or major portions of a series of color photographs comprising a given color motion picture. However, in more elaborate future transmitters the masking matrix might be adjustable by the program director in order to achieve derived artistic effects. The invention is aimed at deriving the best possible performance of either type of matrix, and to the most effective mode of control of adjustable matrices. That is, as described in detail below, the proportioning of the cross-couplings effected by the masking matrix may be coordinated with the process by which the televised picture is produced so as to optimize the color characteristics of the received television image. Transmitter processing circuit 110 may further include circuits (not shown) for correcting for aperture distortion in the film scanner as referred to above. A general description of such transmitter equipment is given in chapter 13 of Principles of Color Television.

The output signals R', G', and B' produced at output terminals 113R, 113G, and 113B of transmitter simulating color-masking matrix 112 in FIG. 1*a* will be respectively proportional to the similarly identified signals specified in paragraph 20 of section B Transmission Standards, of Standards of the Federal Communications Commission for Compatible Color Television. If complete color-television system simulation were necessary, these three signals would then be encoded, modulated on a radio-frequency carrier wave, detected in a color-television receiver, decoded, and applied to the tricolor display of the receiver. However, since the encoding, transmitting, and decoding operations produce a substantially linear transfer of color information, simulation thereof may be omitted. The R', G', and B' signals at terminals 113R, 113G, and 113B may therefore be directly applied to linear amplifiers 114R, 114G, and 114B which respectively weight them in accordance with the unequal drive requirements of the red, green, and blue color-reproducing elements of the television receiver display to derive the requisite R, G, and B signals for actuating that display to produce a received color image. As illustrated, these elements may be the cathodes of a three gun shadow mask color kinescope tube 115. Synchronization of the scanning of each of the three beams in tube 115 with that of cathode-ray tube 30 in the scanner portion of the complete electronic previewer may be effected in conventional manner. That is, deflection circuits 80 of tube 30 in FIG. 1 may be connected by way of terminals 80*a* and 80*b* to the coils of deflecting yoke 117 of tube 115, and blanking circuit 84 of tube 30 may be connected to blanking circuit 118 of tube 115 by way of terminal 84*a*.

The electronic previewer comprised by FIGS. 1 and 1*a* thus simulates the received image produced by a color-television system wherein a derived color picture is scanned by a color-television transmitter to produce original signals representative of predetermined color components thereof, and the original signals are processed by the transmitter circuits to derive corrected signals which will actuate a color-television receiver display to produce a received color image of the derived color picture. The previewer may be utilized to control the photochemical process by which the derived pictures are produced by adjusting the controls of potentiometers 38R, 38B, and 38G until the resultant image on the screen of tricolor tube 115 has a desired appearance. The calibrated settings of those controls will then directly give the proper settings for the controls of the color printer employed in the photochemical process.

The transmitter signal processing simulation circuit 110 is shown as a unit in FIG. 1*a* in order to make it clear that it does not necessarily include gamma-corrector and masking matrix circuits of the kind described. Fundamentally, circuit 110 may be of any design appropriate to simulating a specified transmitter signal processing characteristic. Such signal processing could involve circuits substantially different from conventional gamma correctors and masking matrices, although in the usual case such circuits will be adequate with possibly some degree of adjustment and/or modification. For example, although some color-television transmitters employ a degree of gamma correction which just cancels the nonlinearity of the tricolor display at the receiver, it is contemplated that transmitters will employ excess gamma correction in order to obtain better color reproduction in lowlight regions of the received image of a transmitted color photograph. That will necessitate modification of the proportioning of the cross-coupling paths in masking matrix 112 in order to compensate for the color desaturation which would otherwise occur, as described on pages 171–175, inclusive, of the above-cited textbook Color Television Engineering. Nevertheless, by including in transmitter processing circuit 110 circuits similar to those actually employed at the television transmitter, the previewer will still correctly simulate the received televised images.

When the gamma correctors of the color-television transmitter precede the masking circuit, transmitter signal processing circuit 110 in FIG. 1*a* may be simplified by combining it with the preceding exponential amplifiers 109R, 109G, and 109B. This arrangement is shown in FIG. 4, which would replace all circuitry in FIG. 1*a* between output terminals 103R, 103G, and 103B of dye cross-coupling matrix 103 and input terminals 115R, 115G, and 115B of tricolor tube 115. In FIG. 4 the foregoing matrix output terminals are respectively connected to three nonlinear amplifiers 120R, 120G, and 120B which respectively combine the functions of the exponential amplifier and gamma-corrector circuit of the corresponding channel in FIG. 1*a*. For example, the transfer characteristic of amplifier 120R will be proportional to the product of the transfer characteristics of exponential amplifier 109R and gamma corrector 111R in the red channel of FIG. 1*a*. The resultant transfer characteristics of amplifiers 120R, 120G, and 120B will thus be exponential in nature, but in accordance with a smaller exponent than the corresponding exponential amplifiers in FIG. 1*a*. That is, the transfer characteristic of amplifier 120R will be such that the output signal is proportional to the quantity $$10^{\frac{-D_R}{\gamma_R}}$$

where $D_R$ is the red density-representative signal applied to terminal 103R and $\gamma_R$ is the gamma applicable to the red color reproduction characteristic of the television receiver. Since the circuit of each of amplifiers 120G, 120R, and 120B is exponential, each may be of the same type as that of each of exponential amplifiers 109R, 109G, and 109B in FIG. 1*a*, but differently proportioned as indicated. The output signals from amplifiers 120R, 120G, and 120B are respectively applied to a masking matrix 121 having cross-coupling paths proportional to those of the masking matrix of the television transmitter being simulated. A further circuitry simplification is effected in FIG. 4 by weighting the cross-coupling paths of matrix 121 and the gains of nonlinear amplifiers 120R, 120G, and 120B in accordance with the relative proportions of the fixed gains of driving amplifiers 114R, 114G, and 114B in FIG. 1*a*. This will obviate the need for those amplifiers in FIG. 4, the resultant signals at the matrix output terminals therein being the same as signals R′, G′, and B′ in FIG. 1*a*. A significant difference between the mode of operation of the circuit of FIG. 4 and the portion of FIG. 1*a* which it replaces is that at no point in FIG. 4 are signals produced which are proportional to the television transmitter scanner output signals. In FIG. 1*a* such signals are present at terminals 110R, 110G, and 110B.

The electronic previewer of FIGS. 1 and 1*a* when used with a specified masking matrix 112, or as simplified in accordance with FIG. 4, will enable control of the photochemical process by which color prints to be televised are produced from original color negative 28. The resulting received televised images can thereby be caused to have the best possible color characteristics which can be achieved with the given original negative 28 and a transmitter having the specified color-masking matrix characteristics. However, if the color-masking matrix characteristics of the television transmitter are variable, a still further improvement of the quality of the received color images is possible. The electronic previewer of FIG. 1 is adapted to provide the requisite data for control of such a variable transmitter masking matrix in order to achieve optimum color reception. For this purpose, masking matrix 112 may be constructed as shown in FIG. 5. Preferably, the transmitter masking matrix should be of the same type, although it is possible to convert the data provided by the control settings of the circuit of FIG. 5 to a form applicable to adjustment of other types of variable masking matrices. A feature of the circuit of FIG. 5 is that its controls may be adjusted to nominal "zero" settings in which it effects cross-coupling of the input signals thereto in the same degree as the cross-coupling effected by a specified fixed color-masking matrix characteristic. The settings of the controls of potentiometers 38R, 38G, and 38B may then be adjusted to obtain an image on the screen of tricolor tube 115 having the best possible colorimetric qualities. If the settings of the controls of the color printer in the photochemical picture reproduction process are adjusted in correspondence therein, the resultant photograph will yield a received televised image of best possible quality when televised by a transmitter having the specified fixed masking characteristic. The controls of the masking matrix of FIG. 5 may then be adjusted to still further improve the image on the screen of tube 115 in order to achieve substantially optimum colorimetric qualities. A corresponding adjustment of the controls of a color-television transmitter having an adjustable masking matrix will then result in a similarly optimum received color-television image.

Input terminals 501R, 501G, and 501B of the adjustable masking circuit in FIG. 5 are coupled to the input terminals of a component fixed matrix circuit 503. Output terminals 503Y, 503I, and 503Q of matrix 503 are respectively coupled by three main signal transmission paths to input terminals 504Y, 504I, and 504Q of a second component fixed matrix circuit 504, both fixed matrices thereby being in cascade. Each matrix may comprise nine cross-coupled linear paths by which each input terminal is connected to each output terminal of the same matrix, the path transmissions being proportioned so that the resultant net signal at each output terminal is the sum or difference of specified proportions of all input signals applied to the matrix. The main transmission paths which connect matrices 503 and 504 comprise signal-translating means such as resistors 505 and 506 in series between terminals 503Y and 504Y; signal-translating means such as resistor 507 and potentiometer 509 in series between terminals 503I and 504I; and signal-translating means such as resistor 508 and potentiometer 510 in series between terminals 503Q and 504Q. Additional signal-translating means, which may include other potentiometers, are provided in shunt with the main transmission paths to controllably cross-couple selected portions of the signal in any of those paths either additively or subtractively with signals in the remaining paths, as described in more detail hereinafter. However, all of the signal-translating means are adjustable to a quiescent or nominal "zero" condition wherein the signals at output terminals 503Y, 503I, and 503Q of matrix circuit 503 are individually conveyed in a linear but attenuated manner through the respective main transmission paths to input terminals 504Y, 504I, and 504Q of matrix 504. This zero condition includes adjustment of potentiometers 509 and 510 in the main paths and of the potentiometers in the shunt paths to preseletced nominal "zero" settings which may, for conveniecne, be their mid-positions. Further, for convenience, the main paths may be designed so that these nominal "zero" settings produce identical attenuations therein, the signals at input terminals 504Y, 504I, and 504Q of matrix 504 thus being attenuated replicas of the signals at output terminals 503Y, 503I, and 503Q of matrix 503.

Matrices 503 and 504, and particularly the former, are designed so that under the foregoing "zero" condition the net transfer characteristic between the input terminals of matrix 503 and the output terminals of matrix 504 is the same as that of a standard specified color-masking circuit of a color-television transmitter. That is, as explained on pages 17–117 through 17–120 of "Television Engineering Handbook," by D. G. Fink, published in 1957 by McGraw-Hill Book Co., Inc., the transfer characteristic of such a standard matrix may be described by the following set of typical equations:

$$\begin{aligned} \frac{R'}{a} &= 1.43R'' - 0.25G'' - 0.18B'' \\ \frac{G'}{a} &= -0.31R'' + 1.48G'' - 0.17B'' \qquad (2) \\ \frac{B'}{a} &= -0.33R'' - 0.26G'' + 1.58B'' \end{aligned}$$

In Equations 2 R″, G″, and B″ represent the output signals from the gamma-corrector circuits and R′, G′, and B′ are the requisite masked color signals to be derived therefrom by the masking matrix. The constant factor "*a*" is used to account for the fact that the resultant signals R′, G′, and B′ may be at a lower signal level than R″, G″, and B″ due to losses in the matrixing circuit, which, in a practical installation can be simply compensated for by including a linear amplifier in each channel.

The nine constant coefficients in these equations establish the requisite proportioning of the nine cross-coupling paths of such a standard masking matrix. However, since the circuit of FIG. 5 comprises the two matrices 503 and 504 in cascade, giving a total of eighteen cross-coupling paths, this proportioning can be distributed between both matrices in any desired linear manner. Accordingly, the cross-couplings effected by output matrix 504 may be selected so that any signals at its respective input terminals 504Y, 504I, and 504Q will individually affect selected ones of the color characteristics of the image which will be produced when the resultant output signals R′, G′, and B′ at terminals 502R, 502G, and 502B thereof are respectively applied to the red, green, and blue color control elements of color-television image-reproducing means such as tube 115 in FIG. 1*a*. Then, matrix 503 may be designed to cross-couple the gamma-corrected signals R″, G″, and B″ applied thereto so as to produce signals Y″, I″, and Q″ which, when subjected to the further cross-coupling of matrix 504, yield resultant output signals R′, G′, and B′ in accordance with Equations 2 above or other single selected fixed matrixing coefficients.

More specifically, the cross-coupling paths of output matrix 504 are proportioned similar to the matrix of a color-television receiver; namely, when the signals at its input terminals 504I and 504G are each zero, the signal Y‴ at its remaining input terminal 504Y produces output signals R′, G′, and B′ which result in a black-and-white image on the screen of tube 115. That is, the Y‴ signal will be coupled equally to output terminals 504R, 504G, and 504B of matrix 504 as required by the equations given on page 397 of the above-identified textbook Principles of Color Television for the derivation of R′, G′, and B′ signals from received NTSC color-television signals. The cross-coupling paths of matrix 504 are further proportioned so that when the signal at input terminal 504Q is zero the signals Y‴ and I‴ at input terminals 504Y and 504I reproduce colors along an orange to cyan color axis or path of a Maxwell color triangle, the orange end of this path being near a subjectively correct flesh color. This will result in the I‴ signal being converted to R″, G″, and B″ signals in a manner similar to the usual relation employed in a color-television receiver, but differing somewhat in order to obtain a color axis including a best average subjective flesh color. Finally, the cross-coupling paths of matrix 504 are further proportioned so that when the signal at input terminal 504I is zero the signals Y‴ and Q‴ at input terminals 504Y and 504Q will reproduce colors along a color axis approximately at right angles to the selected flesh color axis so that variations in the Q‴ signal do not affect the average flesh color content of the image produced by tricolor tube 115. The Q‴ signal will thus also be converted to R′, G′, and B′ signals in a manner generally similar to the usual relation in a color-television receiver, controlling colors along a yellowish-green to magenta axis, but may differ therefrom to control colors along an axis of greater subjective importance.

Thus, the equations for matrix 504 are of the general form:

$$R'=k_1Y'''+0.96k_4I'''+0.62k_7Q''' \quad (3)$$

$$G'=k_2Y'''-0.27k_5I'''-0.65k_8Q''' \quad (4)$$

$$B'=k_3Y'''-1.10k_6I'''+1.70k_9Q''' \quad (5)$$

where the numerical constants correspond to those of a color-television receiver, as given on page 397 of Principles of Color Television, and the nine selectable constants $k_1$ to $k_9$, inclusive, are each near unity in value but differ therefrom somewhat to establish the desired color control axes. Specifically, if control of the monochromatic luminance content of the reproduced image is desired along an axis other than the reference "white" of the television system (illuminant C for $R'=G'=B'$ in United States color-television standards) then $k_1$, $k_2$, and $k_3$ will be accordingly modified from unity. Similarly, if the colors along the "flesh" axis produced when Q‴ equals zero are not subjectively optimum, $k_4$, $k_5$, and $k_6$ will be accordingly modified from unity. Finally, if the colors along the nonflesh axis produced when I‴ is zero need modification, then $k_7$, $k_8$, and $k_9$ will be correspondingly changed from unity.

After making a choice of constants $k_1$ through $k_9$, Equations 3, 4, and 5 will contain nine resultant constant coefficients which establish the proportionings of the nine cross-coupling paths of matrix 504. Since those equations place no requirements on the composition of signals Y‴, I‴, and Q‴ but merely establish how these signals are fed to the respective output terminals at which R′, G′, and B′ are produced, any signals respectively applied to matrix input terminals 504Y, 504I, and 504Q will respectively produce the type of color variations cited above. The signals actually so applied are the Y″, I″, and Q″ signals provided by matrix 503 as modified by the signal transmission paths to matrix 504. Assuming first that the adjustable control means shunting the main transmission paths are at their nominal "zero" settings, and that the signal-translating means in those paths have been designed for equal attenuation of direct signals, as described above, the signals Y‴, I‴, and Q‴ supplied by matrix 503 will respectively be the same as the foregoing signals Y″, I″, and Q″ but attenuated by some constant factor such as "*a*" in Equations 2 above. That is, the output signals from matrix 503 will be related to R′, G′, and B′, in this "zero" set condition, by Equations 3, 4, and 5 given above, but with $Y'''=aY''$, $I'''=aI''$, and $Q'''=aQ''$. By substituting the values of $$\frac{R'}{a}$$

$$\frac{G'}{a}$$

and $$\frac{B'}{a}$$

therein from Equations 2 above, a set of equations giving Y″, I″, and Q″ in terms of R″, G″, and B″ will be obtained. These can then be solved to obtain 3 equations expressing Y″, I″, and Q″ in terms of R″, G″, and B″. The nine constant coefficients in this set of equations will establish the proper proportioning of matrix 503 so as to establish, for this illustrative case, the net standard cross-coupling characteristic described by Equations 2 for the entire circuit of FIG. 5.

Considering now the controls of the signal-translating means of FIG. 5, since the I‴ signal at terminal 504I of matrix 504 controls flesh colors in the image produced by tricolor tube 115, adjustment of potentiometer 509 connected to that terminal will control the saturation of flesh colors in the image. Similarly, since the Q‴ signal at terminal 504Q controls the nonflesh colors, adjustment of potentiometer 510 connected thereto will independently control the saturation of nonflesh colors in the image. In order to control the hue of flesh colors, which are produced when Q‴ is near zero and I‴ has a significant value, the circuit of FIG. 5 includes means for cross-coupling controlled proportions of the signal in the I″ transmission channel either additively or subtractively into the Q″ channel. This permits the Q‴ signal, on flesh colors of the desired hues, to have the requisite near-zero value. Corresponding control of the hue of nonflesh colors is effected by means for cross-coupling controlled portions of the signal in the Q″ channel into the I″ channel. In order to control the differential brightness of colors lying on opposite sides of white along the flesh color axis, namely the generally orange flesh colors versus the generally bluish-green hues representative of sky tones, the circuitry of FIG. 5 includes means for either additively or subtractively cross-coupling selected portions of the signal in the I″ transmission channel into the Y″ transmission channel to effect control of the differential brightness of these hues in the image. This will serve as a control of the relative brightness of flesh colors versus sky tones in the image. The differential brightness of the greenish versus magenta hues on opposite sides of white along the nonflesh color axis is similarly controlled by means for either additively or subtractively cross-coupling selected portions of the signal in the Q″ transmission channel into the Y″ transmission channel. Finally, means are provided for introducing a selected degree of nonlinearity into the Y″ signal transmission channel to permit compression or expansion of the contrast range of the luminance of the reproduced image.

More specifically, the various controllable signal-translating means in FIG. 5 may comprise a pair of phase splitter circuits 511 and 512 respectively connected to output terminals 503I and 503Q of matrix 503. Phase splitter circuits are well known in the art, and may simply comprise a vacuum tube amplifier responsive to the signal applied to its grid to produce equal and opposite signals at its cathode and anode. This type of phase splitter is described on pages 13–33, inclusive of the textbook Television Engineering Handbook, edited by D. G. Fink, published in 1957, by McGraw-Hill Book Company, Inc. A pair of potentiometers 513 and 514, the center taps of which are respectively grounded, are connected across the output terminals of phase splitter 511. Signals +I″ and −I″ will thereby be respectively produced at the upper and lower terminals of each of those potentiometers. Similarly, a pair of potentiometers 515 and 516 are respectively connected across the output terminals of phase splitter 512, the center taps of these potentiometers also being grounded. Signals +Q″ and −Q″ will thus be produced at the upper and lower terminals thereof, respectively.

The variable tap of potentiometer 514 is connected by a resistor 517 to the junction of resistor 508 and potentiometer 510 in the main transmission path of the Q″ signal from matrix 503, so that varying the control knob of potentiometer 514 will permit addition or subtraction of varying proportions of the I″ signal to the Q″ signal. This will correspond to adjustment of the hue of flesh axis colors in the resultant image produced by tricolor tube 115. The variable tap of potentiometer 516 is connected by a resistor 518 to the junction of resistor 507 and potentiometer 509 in the main transmission path of the I″ signal. Varying the control knob of potentiometer 516 will thus permit addition or subtraction of varying proportions of the Q″ signal to or from the I″ signal, corresponding to adjustment of the hue of nonflesh axis colors in the reproduced image. The variable taps of potentiometers 513 and 515 are respectively connected, by resistors 522 and 523, to the junction of resistors 505 and 506 in the main transmission path of the Y″ luminance signal. Accordingly, the control knob of potentiometer 513 adjusts the differential brightness of flesh colors versus sky colors in the reproduced image, and the control knob of potentiometer 515 controls the differential brightness of greens versus maggetas therein.

Connected in shunt with resistor 506 in the Y″ transmission path is the series combination of a square law signal-translating circuit 519 driving a phase splitter 520, the terminals of the latter being connected across a potentiometer 521. The center of potentiometer 521 is grounded, the variable tap thereof being connected by way of a resistor 524 to input terminal 504Y of matrix 504. Many circuits capable of providing nonlinear transfer characteristics, and a square law transfer characteristic in particular, are well known, a variety being described on pages 217–224, inclusive, of Principles of Color Television. Accordingly, varying the control knob of potentiometer 521 will permit addition or subtraction of varying proportions of the modified signal $(Y'')^2$ to the modified Y″ signal itself, thus respectively corresponding to either expansion or compression of the contrast range of the image produced by tricolor tube 115. The optimum position for this control will be when it is set so that flesh colors in the image have a subjectively correct brightness.

Each of the flesh color axis potentiometers 509, 513, and 514 and nonflesh color axis potentiometers 510, 515, and 516, as well as contrast potentiometer 521, have been illustrated as being continuously adjustable. However, assuming that the television transmitter includes the same type of adjustable masking matrix, automatic control of the transmitter color-masking matrix characteristics in accordance with the settings of the control knobs of these potentiometers may be facilitated by making all controls variable in discrete steps. Since those controls serve to produce a further improvement of an already high-quality televised color picture, obtained as described above, relatively few steps would probably be adequate. Assuming that three steps in each direction about a zero position would suffice, a total of seven positions would exist for each control. These could be completely identified by the binary numbers from zero to six, requiring three binary digits for each of the seven control knobs or twenty-one binary digits in all. Such digits may be recorded in one row on a punched or magnetic tape, successive rows thereof corresponding to successive color pictures in the series forming a color motion picture to be televised, or may even be recorded on the edge of the film itself. Such digital data may then be "read" by digital control equipment at the transmitter for automatically adjusting the controls of the corresponding masking matrix therein.

In summary, therefore, the variable masking circuit of FIG. 5 provides one set of controls to adjust the color which is critical in most scenes, namely flesh color, and a second separate set of controls to adjust other colors without upsetting the previously adjusted flesh color. By this means, rapid scene-by-scene adjustment of the electronic color-masking characteristics of a color-television transmitter is practical. Further, by using this variable masking circuit in the electronic previewer described above with reference to FIGS. 1–4, inclusive, it is possible to develop a color print from an original photograph in such a way that it will result in the best possible received television image in a system employing a transmitter having a standard color-masking circuit, and, in addition, to supply information with the print for controlling a transmitter having an adjustable masking circuit so as to produce a substantially optimum received television image. The invention thus not only makes it possible to obtain the best results from new color motion pictures expressly prepared for color-television transmission, but also enables improved results to be obtained from the great existing store of negative and positive color motion picture film prepared without that objective in mind.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An electronic previewer for simulating the color-processing characteristics of a system wherein a derived color picture is photochemically prepared from an original color picture and the derived picture is utilized in a color-television system to obtain a received color-television image thereof, said photochemical process involving production of a plurality of color dyes in the derived picture having densities determined by the relative proportions of corresponding color components of a printing light transmitted through said original color picture, and said color-television system including a transmitter which scans the derived picture to produce original signals representative of predetermined color components thereof and processes those signals to convert them to resultant signals for actuating a color-television receiver, to display an image of said derived picture said previewer comprising: the combination of means for scanning said original picture and means adapted to simulate said photochemical process and the spectral taking characteristics of said television transmitter so as to obtain color-representative signals respectively proportional corresponding to the original signals produced by said transmitter from said derived color picture, said simulating means being adapted to adjust the relative proportions of said color-representative signals; means for nonlinearly translating those signals; signal-processing circuit means for modifying each of said nonlinearly translated color-representative signals in accordance with at least part of the signal processing by which said color-television transmitter converts the corresponding ones of said original signals to said resultant signals; and color-image-reproducing means responsive to said modified signals to produce a color image corresponding thereto; whereby the color image produced by said previewer will have substantially the same appearance as that which will be produced by said color-television receiver when the relative proportions of the color components of the printing light employed in said photochemical process are adjusted in accordance with the adjustment of said simulating means.

2. An electronic previewer for simulating the color-processing characteristics of a system wherein a derived color picture is photochemically prepared from an original color picture and the derived picture is utilized in a color-television system to obtain a recieved color-television image thereof, said photochemical process involving production of a plurality of color dyes in the derived picture having densities determined by the relative proportions of corresponding color components of a printing light transmitted through said original color picture, and said color-television system including a transmitter which comprises means for scanning the derived picture to produce original signals repersentative of predetermined color components thereof and means for effecting gamma-correction and electronic color-masking of those signals to obtain resultant signals for actuating a color-television receiver to display an image of said derived picture, said previewer comprising: the combination of means for scanning said original picture and means adapted to simulate said photochemical process and the spectral taking characteristics of said television transmitter so as to obtain color-representative signals respectively corresponding to the original signals produced by said transmitter from said derived color picture, said simulating means being adapted to adjust the relative proportions of said color-representative signals; means for exponentially translating each of said color-representative signals at least partially in accordance with the gamma correction to which said transmitter subjects said original signals; signal-processing circuit means including an electronic masking circuit for cross-coupling said exponentially translated signals in accordance with the electronic color masking effected by said transmitter; and color image-reproducing means responsive to said cross-coupled signals to produce a color image corresponding thereto; whereby the color image produced by said previewer will have substantially the same appearance as that which will be produced by said color-television receiver when the relative proportions of color components of the printing light employed in said process are adjusted in accordance with the adjustment of said photochemical simulating means.

3. An electronic previewer for simulating the color-processing characteristics of a system wherein a derived color picture is photochemically prepared from an original color picture and the derived picture is utilized in a color-television system to obtain a received color-television image thereof, said photochemical process involving production of a plurality of color dyes in the derived picture having densities determined by the relative proportions of corresponding color components of a printing light transmitted through said original color picture, and said color-television system including a transmitter which comprises means for scanning the derived picture to produce original signals representative of predetermined color components thereof and means for effecting gamma-correction and electronic color-masking of those signals to obtain resultant signals for actuating a color-television receiver to display an image of said derived picture, said previewer comprising: the combination of means for scanning said original picture and means adapted to simulate said photochemical process and the spectral taking characteristics of said television transmitter so as to obtain color-representative signals respectively corresponding to the original signals produced by said transmitter from said derived color picture, said simulating means being adapted to adjust the relative proportions of said color-representative signals; means for exponentially translating each of said color-representative signals in accordance with the gamma correction to which said transmitter subjects said original signals; signal-processing circuit means including an adjustable electronic masking circuit for cross-coupling adjustable proportions of said exponentially translated signals, the adjustable proportions thereof including the proportioning corresponding to a specified color-masking characteristic of said transmitter and further including proportionings corresponding to modified color-masking characteristics thereof; and color image-reproducing means responsive to said modified signals to produce a color image corresponding thereto; whereby said simulating means may be adjusted so that the color image produced by said previewer has the best possible appearance when the cross-coupling proportions of said adjustable masking circuit correspond to said specified transmitter color-masking characteristic, such adjustment thereby indicating the proper proportions of said color components of the printing light in said photochemical process so as to derive a color picture which will result in a similarly best possible received color-television image when said transmitter has said specified masking charcteristic, and the cross-coupling proportions of said adjustable masking circuit may then be adjusted to achieve a substantially optimum appearance of the color image produced by said previewer, such proportioning thereby indicating the proper color-masking characteristic of said transmitter for producing a substantially optimum received color-television image from the color picture so derived.

4. An electronic previewer for simulating the color-processing characteristics of a system wherein a derived color picture is photochemically prepared from an original color picture and the derived picture is utilized in a color-television system to obtain a received color-television image thereof, said photochemical process involving production of a plurality of color dyes in the derived picture having densities determined by the relative proportions of corresponding color components of a printing light transmitted through said original color picture, and said color-television system including a transmitter which scans the derived picture to produce original signals representative of predetermined color components thereof and processes those signals to convert them to resultant signals for actuating a color-television receiver to display an image of said derived picture, said previewer comprising: the combination of means for scanning said original color picture and means adapted to simulate said photochemical process so as to obtain electrical signals respectively proportional to the densities of said color dyes of said derived picture, said simulating means including calibrated controls for adjusting the magnitudes of said density-representative signals in accordance with the relative proportions of the corresponding ones of said color components of the printing light employed in said photochemical process; said simulating means including matrixing means for cross-coupling portions of certain of said density-representative signals with other of those signals in accordance with the overlapping of the spectral absorption characteristics of the corresponding dyes with respect to the spectral taking characteristics of said color-television transmitter; means connected to said matrixing means for exponentially translating each of said cross-coupled signals in accordance with at least a portion of the relation between the density represented thereby and the corresponding one of said original signals produced by said color-television transmitter from said derived picture; signal-processing circuit means connected to said translating means for modifying each of the exponentially translated signals in accordance with at least a portion of the signal processing by which said color-television transmitter converts the corresponding ones of said original signals to said resultant signals; and color image-reproducing means responsive to said modified signals to produce a color image corresponding thereto; whereby the color image produced by said previewer will have substantially the same appearance as that which will be produced by said color-television receiver when the relative proportions of the color components of the printing light employed in said photochemical process are adjusted in accordance with the settings of said calibrated controls of said simulating means.

5. An electronic previewer for simulating the color-processing characteristics of a system wherein a derived color picture is photochemically prepared from an original color picture and the derived picture is utilized in a color-television system to obtain a received color-television image thereof, said photochemical process involving production of a plurality of color dyes in the derived picture having densities determined by the relative proportions of corresponding color components of a printing light transmitted through said original color picture, and said color-television system including a transmitter which comprises means for scanning the derived picture to produce original signals representative of predetermined color components thereof and means for effecting gamma-correction and electronic color masking of those signals to obtain resultant signals for actuating a color-television receiver to display an image of said derived picture, said previewer comprising: the combination means for scanning said original color picture and means adapted to simulate said photochemical process so as to obtain electrical signals respectively proportional to the densities of said color dyes of said derived picture, said simulating means including calibrated controls for adjusting the magnitudes of said density-representative signals in accordance with the relative proportions of the corresponding ones of said color components of the printing light employed in said photochemical process; matrixing means connected to said simulating means for cross-coupling portions of certain of said density-representative signals with other of those signals in accordance with the overlapping of the spectral absorption characteristics of the corresponding dyes with respect to the spectral taking characteristics of said color-television transmitter; means connected to said matrixing means for exponentially translating each of said cross-coupled signals in accordance with the relation between the density represented thereby and the corresponding one of said original signals produced by said color-television transmitter from said derived picture and further in accordance with the gamma correction to which said transmitter subjects such original signals; signal-processing circuit means connected to said translating means and including an electronic masking circuit for cross-coupling said exponentially translated signal in accordance with the electronic color-masking effected by said transmitter; and color-image-reproducing means responsive to said modified signals to produce a color image corresponding thereto; whereby the color image produced by said previewer will have substantially the same appearance as that which will be produced by said color-television receiver when the relative proportions of the color components of the printing light employed in said photochemical process are adjusted in accordance with the settings of said calibrated controls of said simulating means.

6. An electronic previewer for simulating the color-processing characteristics of a system wherein a derived color picture is photochemically prepared from an original color picture and the derived picture is utilized in a color-television system to obtain a received color-television image thereof, said photochemical process involving production of a plurality of color dyes in the derived picture having densities determined by the relative proportions of corresponding color components of a printing light transmitted through said original color picture, and said color-television system including a transmitter which comprises means for scanning the derived picture to produce original signals representative of predetermined color components thereof and means for effecting gamma-correction and electronic color masking of those signals to obtain resultant signals for actuating a color-television receiver to display an image of said derived picture, said previewer comprising: the combination of means for scanning said original color picture and means adapted to simulate said photochemical process so as to obtain electrical signals respectively proportional to the densities of said color dyes of said derived picture, said simulating means including calibrated controls for adjusting the magnitudes of said density-representative signals in accordance with the relative proportions of the corresponding ones of said color components of the printing light employed in said photochemical process; matrixing means connected to said simulating means for cross-coupling portions of each of said density-representative signals with other of those signals in accordance with the overlapping of the spectral absorption characteristics of the corresponding dyes with respect to the spectral taking characteristics of said color-television transmitter; means connected to said matrixing means for exponentially translating each of said cross-coupled signals in accordance with the relation between the density represented thereby and the corresponding one of said original signals produced by said color-television transmitter from said derived picture and further in accordance with the gamma correction to which said transmitter subjects such original signals; signal-processing circuit means including an adjustable electronic masking circuit for cross-coupling adjustable proportions of said exponentially modified signals, the adjustable proportions thereof including the proportioning corresponding to a specified color-masking characteristic of said transmitter and further including proportionings corresponding to modified color-masking characteristics thereof; and color-image-reproducing means responsive to said modified signals to produce a color image corresponding thereto; whereby the settings of said calibrated controls of said photochemical simulating means may be adjusted so that the color image produced by said previewer has the best possible appearance when the cross-coupling proportions of said adjustable masking circuit correspond to said specified transmitter color-masking characteristic, such control settings thereby indicating the proper proportions of the color components of the printing light employed in said photochemical process so as to derive a color picture which will result in a similarly best possible received color-television image when said transmitter has said specified masking characteristic, and the cross-coupling proportions of said adjustable masking circuit may then be adjusted to achieve a substantially optimum appearance of the color image produced by said previewer, such proportioning thereby indicating the proper color-masking characteristic of said transmitter for producing a substantially optimum received color-television image from the color picture so derived.

7. An adjustable electronic masking circuit for a color signal-translating system for individually adjusting each of a pair of signals representative of the color of an image to be reproduced therefrom, comprising: means for supplying a first signal representative of a first set of proportions of color primaries; means for supplying a second signal representative of a second set of different proportions of said color primaries; a first signal-translating channel for translating said first signal; and a second signal-translating channel for translating said second signal; said first channel including means for adjusting the amplitude of said first signal to control the saturation of the colors represented by said first signal and including further means for cross-coupling an adjustable amount of either polarity of said first signal into said second channel to control the hue of the colors represented by said first signal; said second channel including means for adjusting the amplitude of said second signal to control the saturation of the colors represented by said second signal and including further means for cross-coupling an adjustable amount of either polarity of said second signal into said first channel to control the hue of the colors represented by said second signal.

8. An adjustable electronic masking circuit in accordance with claim 7 in which there is included a third channel for translating a brightness representative signal and in which said first and second channels each include means for cross-coupling an adjustable amount of either polarity of the signal in the corresponding channel into said third channel to control the brightness of the color represented by the signal being translated by the respective color signal-translating channel.

9. An adjustable electronic masking circuit in accordance with claim 7 in which the colors represented by said first signal, when said second signal is zero, include a color corresponding to flesh tone.

10. An adjustable electronic masking circuit in accordance with claim 8 in which the colors represented by said first signal, when said second signal is zero, include a color corresponding to flesh tone.

References Cited in the file of this patent

UNITED STATES PATENTS

| | | |
|---|---|---|
| 2,757,571 | Loughren | Aug. 7, 1956 |
| 2,790,844 | Neugebauer | Apr. 30, 1957 |
| 2,873,312 | Moe | Feb. 10, 1959 |
| 2,976,348 | Bailey | Mar. 21, 1961 |